Nov. 30, 1965   A. F. GATTIKER, JR   3,220,526
ONE SHOT CLUTCH
Filed July 20, 1964   3 Sheets-Sheet 1
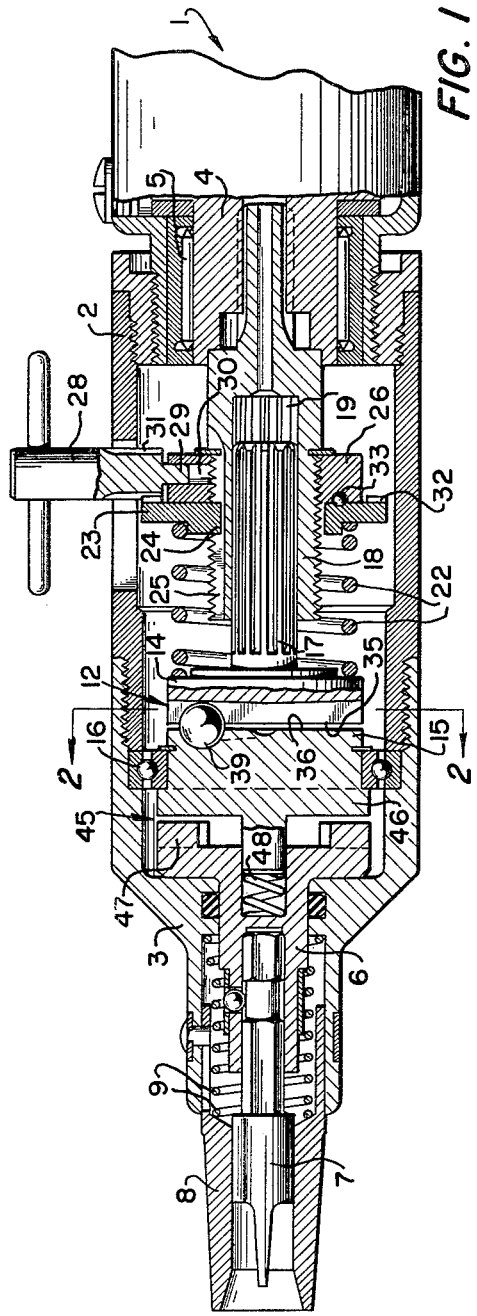
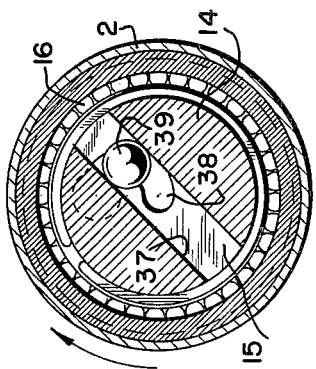
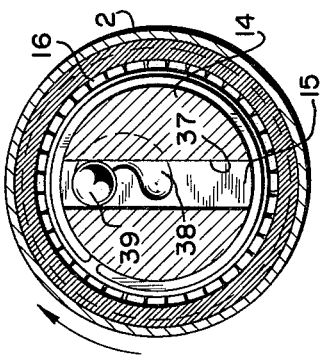
INVENTOR.
ALBERT F. GATTIKER, JR.
BY
David W. Tillott
ATTORNEY Nov. 30, 1965  A. F. GATTIKER, JR  3,220,526
ONE SHOT CLUTCH
Filed July 20, 1964  3 Sheets-Sheet 2
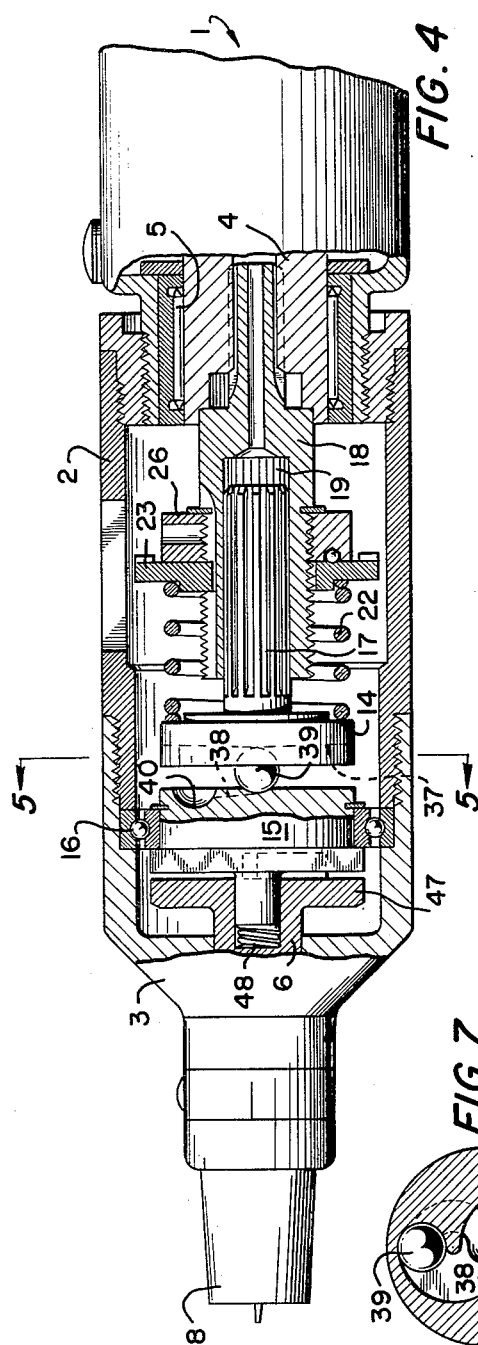
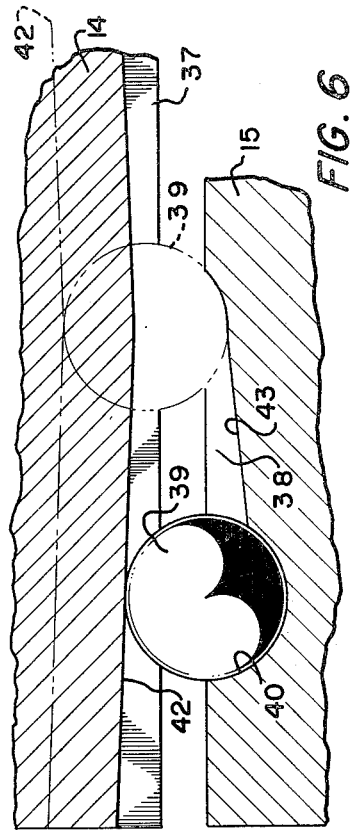
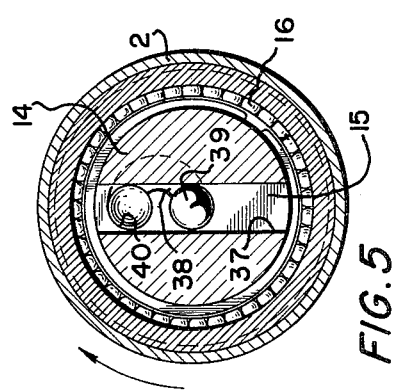
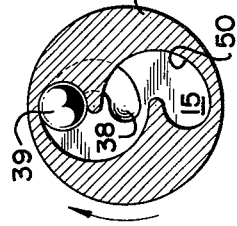
INVENTOR.
ALBERT F. GATTIKER, JR.
BY
David W. Tillott
ATTORNEY INVENTOR.
ALBERT F. GATTIKER, JR.
BY
David W. Tilbott
ATTORNEY

United States Patent Office 3,220,526
Patented Nov. 30, 1965

3,220,526
ONE SHOT CLUTCH
Albert F. Gattiker, Jr., Athens, Pa., assignor to Ingersoll-Rand Company, New York, N.Y., a corporation of New Jersey
Filed July 20, 1964, Ser. No. 383,689
11 Claims. (Cl. 192—150)

This invention relates to a torque release clutch mechanism which opens a drive connection between a driving member and a driven member when the torque load on said members exceeds a predetermined value or magnitude. The torque release clutch mechanism of this invention is particularly useful in tools which apply torque loads to fasteners, such as power-operated wrenches or screwdrivers.

In driving a screw or other threaded fastener "home," into a holding position, it is highly desirable to use a power-operated tool containing a torque release clutch which automatically releases the torque driving force on the fastener after it is tightened to a selected or predetermined torque load. In order to prevent the tool from "kicking" the operator, the clutch must release the torque load at a relatively high speed; otherwise if the clutch releases relatively slowly, the operator receives an undesirable reaction torque while the clutch is releasing. During the period that the clutch is engaged, the drive from the tool motor to the fastener must be as rigid (non-yielding) as possible for efficient transmission of the torque. On the other hand, once the clutch releases, the release of torque must be complete to prevent the application of an undesirable reaction torque on the operator.

The principal object of this invention is to provide a torque release clutch mechanism having a relatively simplified structure of a novel type and which substantially eliminates or minimizes the foregoing problems.

Other important objects of this invention are: to provide a torque release clutch mechanism which releases itself under a selected or predetermined torque load with the torque release taking place at a relatively high speed and being a substantially complete torque release; to provide a relatively simple and economical torque responsive clutch mechanism which can be adjusted to release under a variety of different torque loads; to provide a torque responsive clutch mechanism which substantially rigidly transmits a torque load before releasing and which releases the transmission of torque substantially completely after it is released; and to provide a torque responsive clutch mechanism adapted to cooperate with a motor shut-off means for automatically deenergizing a motor in response to the release of the clutch mechanism.

In general, these objects are attained in a clutch mechanism including a pair of rotatably mounted clutch members or plates which are axially aligned and have opposing spaced faces. The clutch members are mounted for relative axial movement with a biasing means for urging the clutch faces together. A key ball is located between the plates and lying in a groove formed in each clutch face with each groove extending between a clutch-released position of the key ball at the axis of the clutch plates and a clutch-engaged position of the key ball spaced radially from the axis of the clutch plates and shaped for the key ball to roll between the two positions. At least one of the grooves is curved in a manner so that relative rotation between the clutch plates in a given direction will cam the key ball radially inward from its clutch-engaged position to its clutch released position.

The invention is described in connection with the accompanying drawings wherein:

FIG. 1 is a fragmentary elevational view with portions broken away of a power screwdriver containing a torque responsive clutch made in accordance with this invention, with the clutch being shown in an engaged position;

FIG. 2 is a section of FIG. 1 taken along line 2—2;

FIG. 3 is a section similar to FIG. 2 showing the clutch partly released; i.e., in a position midway between its engaged and released positions;

FIG. 4 is an elevational view with portions broken away similar to FIG. 1 and showing the clutch mechanism in a completely released position;

FIG. 5 is a section taken on line 5—5 of FIG. 4;

FIG. 6 is a fragmentary enlarged view of a portion of FIG. 1 showing the details of the releasing structure of the clutch mechanism;

FIG. 7 is a sectional view similar to FIG. 2 of a modified embodiment using a different shape of ball groove on one clutch member;

Figure 8:
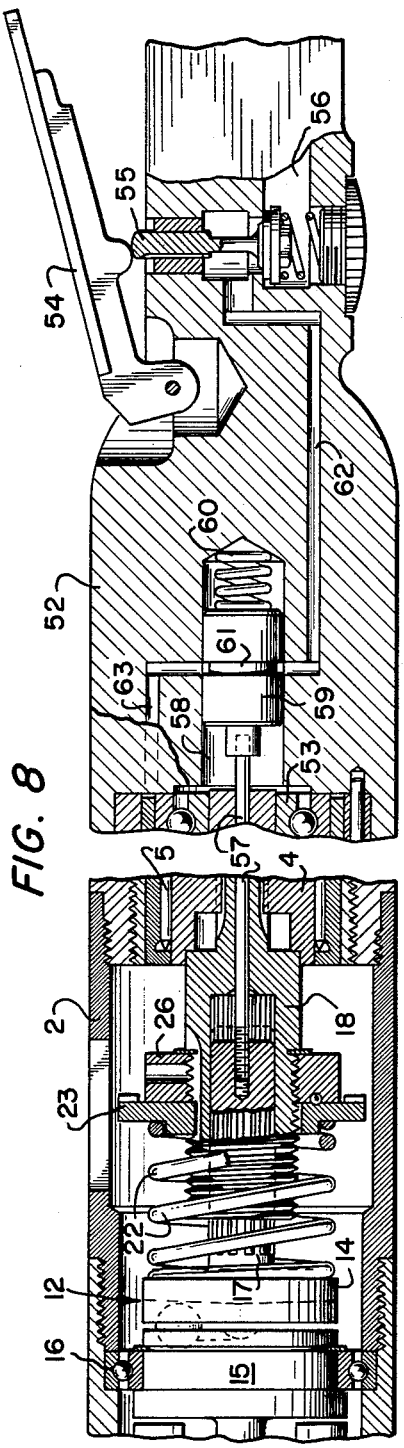
Figure 9:
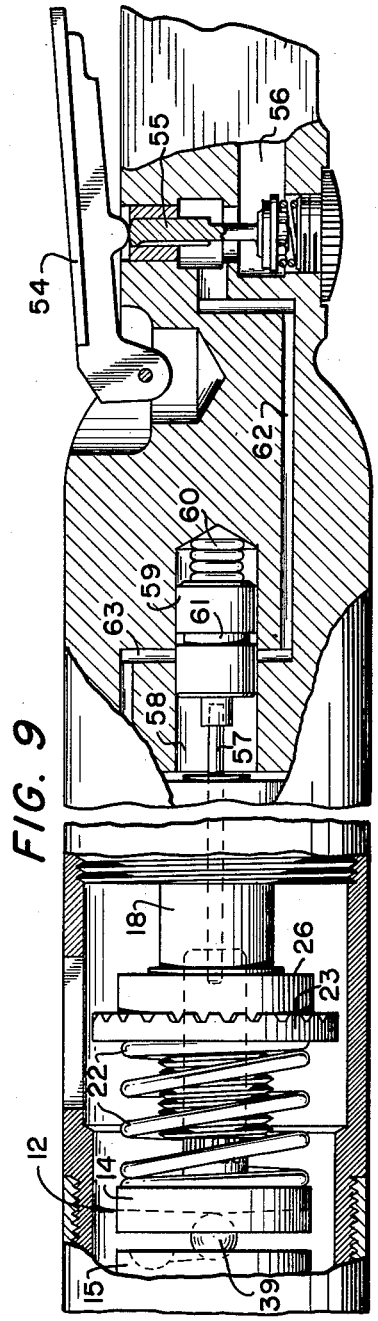

FIG. 8 is an elevational view with portions broken away and shown in section of a third embodiment containing a normally open valve which is adapted to be closed to shut off the tool motor in response to the release of the clutch mechanism, the clutch mechanism being shown in this view in an engaged position and the hand throttle of the tool being closed; and FIG. 9 is a view similar to FIG. 8 showing the clutch mechanism in a released position, the hand throttle in an open position and the shut-off valve in a closed position.

The front portion of a power screwdriver 1 is illustrated in FIG. 1. The front portion of the screwdriver 1 includes a forward casing 2 having a nose 3. The rear portion of the screwdriver 1 which is not shown has a motor which drives the main drive shaft 4 mounted in bearings 5 at the rear end of the forward casing 2. The nose 3 contains a spindle 6 adapted to receive a screwdriver bit 7. A screw finder 8 is slidably mounted on the front of the nose 3 and urged axially forward by a spring 9. All of the foregoing structure is conventional in power screwdrivers.

This invention lies in the clutch mechanism 12 for interconnecting the main drive shaft 4 with the spindle 6 and releasing this drive connection when the torque load rises to a predetermined value or magnitude of torque. The clutch mechanism 12 includes a rear clutch member or plate 14 and a front clutch member or plate 15. The front clutch plate 15 is mounted in a bearing 16 in a manner to prevent its axial movement while allowing it to rotate freely. The rear clutch plate 14 is integrally fixed to a rearwardly projecting splined shaft 17. An extension shaft 18 is fixed to the main drive shaft 4 to extend forwardly from it and has a coaxial socket 19 containing internal splines slidably receiving the splined shaft 17 so that the splined shaft 17 can slide axially in the socket 19 while being keyed to the extension shaft 18 to prevent relative rotation between the shafts 17 and 18.

A heavy spring 22 surrounds the splined shaft 17 and engages the rear face of the rear clutch plate 14 to urge the rear clutch plate 14 forward. The rear end of the spring 22 abuts an annular spring seat 23 which is slidably keyed on the extension shaft 18. The spring seat 23 has an inwardly projecting radial tang 24 sliding in a longitudinal keyway 25 cut into the exterior of the extension shaft 18. An adjustment nut 26 is threaded on the extension shaft 18 for holding the spring seat 23 at a desired location on the extension shaft 18.

The nut 26 is turned on the extension shaft 18 by the use of a geared chuck key 28, shown in FIG 1. The chuck key 28 has an axial pin 29 at its front end adapted to fit in a socket 30 formed in the circumference of the nut 26 and the gear teeth 31 of the key 28 engage corresponding teeth 32 on the rear face of the spring seat 23. Looking at FIG. 1, it should be readily seen that the rotation of the chuck key 28 causes the spring seat.

23 and extension shaft 18 to rotate relative to the nut 26, thus adjusting the nut 26 among the extension shaft 18. The chuck key 28 is withdrawn from the tool during its operation. The nut 26 carries a detent ball 33 on its forward face adapted to seat in one of a series of depressions on the rear face of the spring seat 23 for preventing the nut 26 from inadvertently moving out of adjustment on the extension shaft 18 during the operation of the tool.

The rear clutch plate 14 has a front face 35 lying in a diametrical plane and the front clutch plate 15 has a rear face 36 lying in a diametrical plane and facing face 35. The two clutch faces 35 and 36 are the operative faces of the clutch mechanism 12.

The face 35 on the rear clutch plate 14 contains a diametrically extending groove 37 and the face 36 on the front clutch plate 15 contains a C-shaped groove 38 with one end of the C-groove lying on the axis of the clutch face 36 and the other spaced radially outward of the axis. The two grooves 37 and 38 cooperate to hold a key ball 39 between the two clutch faces 35 and 36. The outer end of the C-shaped groove 38, remote from the axis of the clutch plates, contains a deeper ball seat 40 for detaining the key ball 39 prior to the release of the clutch mechanism 12. The C-shaped groove 38 is arranged as shown in FIGS. 2 and 3 so that the clutch plate 14 can rotate clockwise relative to the clutch plate 15 and cam the key ball 39 along the groove 38 as a result of this relative rotation. The camming force acting on the ball 39 includes a circumferentially acting component and a radially acting component. These two force components must be present in order for the clutch to release and are the result of the shape of the two grooves 37 and 38.

The bottom 42 of the diametrical groove 37 is sloped relative to the diametrical plane as shown in FIG. 6 with the portion of the groove bottom 42 lying on the axis being located ahead of the rest of the groove 37. In like manner, the bottom 43 of the C-shaped groove 38 is sloped relative to the diametrical plane with the axial portion of the groove bottom 43 being located rearward of the rest of the groove 38. The reason for this sloping of the groove bottoms 42 and 43 is to cause the key ball 39 to cam the two clutch plates 14 and 15 apart as the key ball 39 moves along the grooves 37 and 38 to a position along the center or axis of the clutch plates. Due to the fact that the clutch plates 14 and 15 are moved apart as the ball 39 moves to its central position, the ball 39 will be urged radially outward with sufficient force to return the key ball 39 to its original position seated in the ball seat 40 when the driving torque force on the rear clutch plate 14 is discontinued.

When the key ball 39 is seated in the ball seat 40 as shown in solid lines in FIG. 6, the clutch is engaged and able to transmit a torque load. In this position, the spacing between the faces 35 and 36 of the clutch plates 14 and 15 is at a minimum. The key ball 39 will remain in the ball seat 40 until the torque load on the clutch plates 14 and 15 is sufficient for the ball 39 to cam itself out of the ball seat 40 and into the rest of the groove 38. This releasing torque load will depend on the force of the spring 22 acting to hold the clutch plates 14 and 15 together.

Once the ball 39 rises out of its seat 40, as shown in FIG. 3, the torque load will quickly sweep the ball 39 the length of the C-shaped groove 38 to a position lying along the axis of the clutch plates 14 and 15, as shown in dotted lines in FIG. 6. This latter position of the ball 39 is its clutch-released position. Once the ball 39 is lying in its axial clutch-released position, the clutch plates 14 and 15 can freely rotate relative to each other with the ball 39 remaining in its axial position and the rear clutch plate 14 remaining in its axially spaced position from the clutch plate 15, as shown by the dotted line 42' in FIG. 6 which represents the bottom 42 of the groove 37 when the clutch plate 14 is raised rearwardly from the clutch plate 15.

As soon as the rotary driving force on the rear clutch plate 14 is discontinued, the biasing force urging the clutch plate 14 forward, due to the sloping bottoms 42 and 43 of the grooves 37 and 38, will move the ball 39 radially outward to its clutch-engaged position lying in the ball seat 40.

The front clutch plate 15 is connected to the spindle 6 by a conventional push-engaged clutch 45. The clutch 45 includes a diametrical bar 46 integrally formed on the front face of the clutch plate 15 and adapted to engage a bifurcated jaw 47 formed on the rear end of the spindle 6. A spring 48 normally holds the jaw 47 axially displaced from engagement with the bar 46 so that the tool motor can run freely until the tool is axially pushed against a fastener. This type of operation is conventional in the art of power screwdrivers.

*Second Embodiment—FIG. 7*

A second embodiment is shown in FIG. 7 wherein the diametrical groove 37 in the rear clutch plate 14 is changed to an S-shaped groove 50. This shape of groove cooperates with the C-shaped groove 38 on the front clutch plate 15 to provide a greater camming force on the key ball 39 acting to force the ball 39 to the axial central clutch-released position than is the case with the first embodiment using the straight diametrical groove 37.

*Third Embodiment—FIGS. 8 and 9*

A third embodiment is shown in FIGS. 8 and 9 wherein the clutch mechanism 12 operates a motor shut-off valve to stop the motor in response to the release of the clutch mechanism. These figures show a tool backhead 52 attached to the front casing 2 and containing an air motor driving a motor rotor 53. A manual throttle lever 54 is pivoted on the backhead 52 and engages a throttle valve 55. Air pressure enters the backhead 52 through a passage 56 leading to the valve 55. The throttle valve 55 is biased into position sealing the outlet of the passage 56.

The splined shaft 17 fixed to the rear of the rear clutch plate 14 is attached to a push-rod 57 which extends rearwardly through the motor rotor 53 and into an axial valve bore 58. The rear end of the push-rod 57 is attached to a spool valve 59 sliding in the valve bore 58. The spool valve 59 is biased forward by a light spring 60.

The spool valve 59 contains a circumferential groove 61. In the normal position of the spool valve 59 shown in FIG. 8, with the clutch mechanism engaged, the groove 61 interconnects a passage 62 running from the throttle valve 55 to the valve bore 58 and a passage 63 feeding air pressure from the valve bore 58 to the motor. Thus, in the engaged position of the clutch mechanism, the spool valve 59 is open and allows air pressure to pass from the throttle valve 55 to the air motor of the tool.

When the clutch mechanism 12 releases, the rear clutch plate 14 moves rearwardly and, through the push-rod 57, moves the spool valve 59 to shut off the passage 63 from the passage 62, thus shutting off the air motor. This position of the valve 59 is shown in FIG. 9. When the clutch mechanism returns to its engaged position, the valve 59 is returned to its normally open position, as shown in FIG. 8, by the spring 60.

Although this invention describes several embodiments, it should be recognized that the invention is not limited merely to these embodiments, but contemplates other embodiments and variations which utilize the concepts and teachings of the invention.

Having described my invention, I claim:
1. A torque responsive clutch mechanism comprising:
   (a) a pair of rotatably mounted clutch members which are relatively movable in an axial direction and each having a laterally extending face facing the face on the other clutch member;

(b) biasing means urging said clutch members and their faces axially together;

(c) a key ball resiliently held between the faces of said clutch members by said biasing means;

(d) a groove located in the face of each clutch member and receiving a portion of said key ball, each groove extending between a clutch-released position of the key ball at the axis of rotation of its clutch member and a clutch-engaged position of the key ball spaced radially from the axis of rotation of the clutch member and shaped for said key ball to roll along the groove between said positions; and (e) at least one of said grooves extending along a curved path between said clutch-engaged and clutch-released positions whereby said key ball can be cammed from said clutch-engaged position to said clutch-released position by a predetermined torque load on said clutch members.

2. The clutch mechanism of claim 1 including:
(a) means for adjusting the force of said biasing means to vary the torque load at which said clutch members release.

3. The clutch mechanism of claim 1 wherein:
(a) at least one of said faces includes a ball seating detent in the bottom of its groove at the clutch-engaged position for receiving said key ball whereby said key ball has to rise out of said detent before moving to said clutch-released position.

4. The clutch mechanism of claim 1 wherein:
(a) the bottom of at least one of said grooves is sloped relative to the bottom of the other groove and arranged so that the key ball cams the faces apart in moving from said clutch-engaged position to said clutch-released position.

5. The clutch mechanism of claim 1 wherein:
(a) at least one of said grooves extends generally radially outward on opposite sides of the axial clutch-released position whereby said key ball can move to its clutch-engaged position by moving toward either end of said groove.

6. A power tool for driving threaded fasteners and the like, said tool comprising:
(a) a tool body;
(b) a motor in said body;
(c) a tool spindle in said body adapted to drive a fastener;
(d) a pair of rotatably mounted clutch members in said body between said spindle and said motor forming a clutch mechanism for interconnecting said motor to said spindle;
(e) said clutch members being relatively movable in an axial direction and each having a transversely extending face facing the face on the other clutch member;

(f) biasing means urging said clutch members and their faces axially together;

(g) a key ball resiliently held between the faces of said clutch members by said biasing means;

(h) a groove located in the face of each clutch member and receiving a portion of said key ball, each groove extending between a clutch-released position of said key ball at the axis of rotation of its clutch member and a clutch-engaged position of said key ball spaced radially from the axis of rotation of the clutch member and shaped for said key ball to roll along the groove between said positions; and (i) at least one of said grooves extending along a curved path between said clutch-engaged and clutch-released positions whereby said key ball can be cammed from said clutch-engaged position to said clutch-released position by a predetermined torque load on said clutch members.

7. The power tool of claim 6 including:
(a) means for adjusting the force of said biasing means to vary the torque load at which said clutch members release.

8. The power tool of claim 6 wherein:
(a) at least one of said faces includes a ball seating detent in the bottom of its groove at the clutch-engaged position for receiving said key ball whereby said key ball has to rise out of said detent before moving to said clutch-released position.

9. The power tool of claim 6 wherein:
(a) the bottom of at least one of said grooves is sloped to the bottom of the other groove and arranged so that the key ball cams the faces apart in moving from said clutch-engaged position to said clutch-released position.

10. The power tool of claim 6 wherein:
(a) at least one of said grooves extends generally radially outward on opposite sides of the axial clutch-released position whereby said key ball can move to its clutch-engaged position by moving to either end of said groove.

11. The power tool of claim 6 including:
(a) a normally open valve controlling a supply of fluid pressure to said motor, said motor being driven by fluid pressure; and
(b) means connected between said clutch members and said valve for closing said valve in response to the release of said clutch mechanism.

References Cited by the Examiner
UNITED STATES PATENTS

| | | | |
|---|---|---|---|
| 2,182,627 | 12/1939 | Gauld | 192—56 |
| 2,969,132 | 1/1961 | Stewart | 192—56 |
| 3,187,860 | 6/1965 | Simmons | 192—150 |

DAVID J. WILLIAMOWSKY, *Primary Examiner.*